Sept. 11, 1956 W. A. MASON, JR., ET AL 2,762,282
IMPLEMENT ATTACHING APPARATUS FOR TRACTORS
Filed June 25, 1954 3 Sheets-Sheet 1

INVENTORS
WYLIE A. MASON, JR.
DONALD S. BROWNLEE
ATTORNEY

Sept. 11, 1956 W. A. MASON, JR., ET AL 2,762,282
IMPLEMENT ATTACHING APPARATUS FOR TRACTORS
Filed June 25, 1954 3 Sheets-Sheet 2
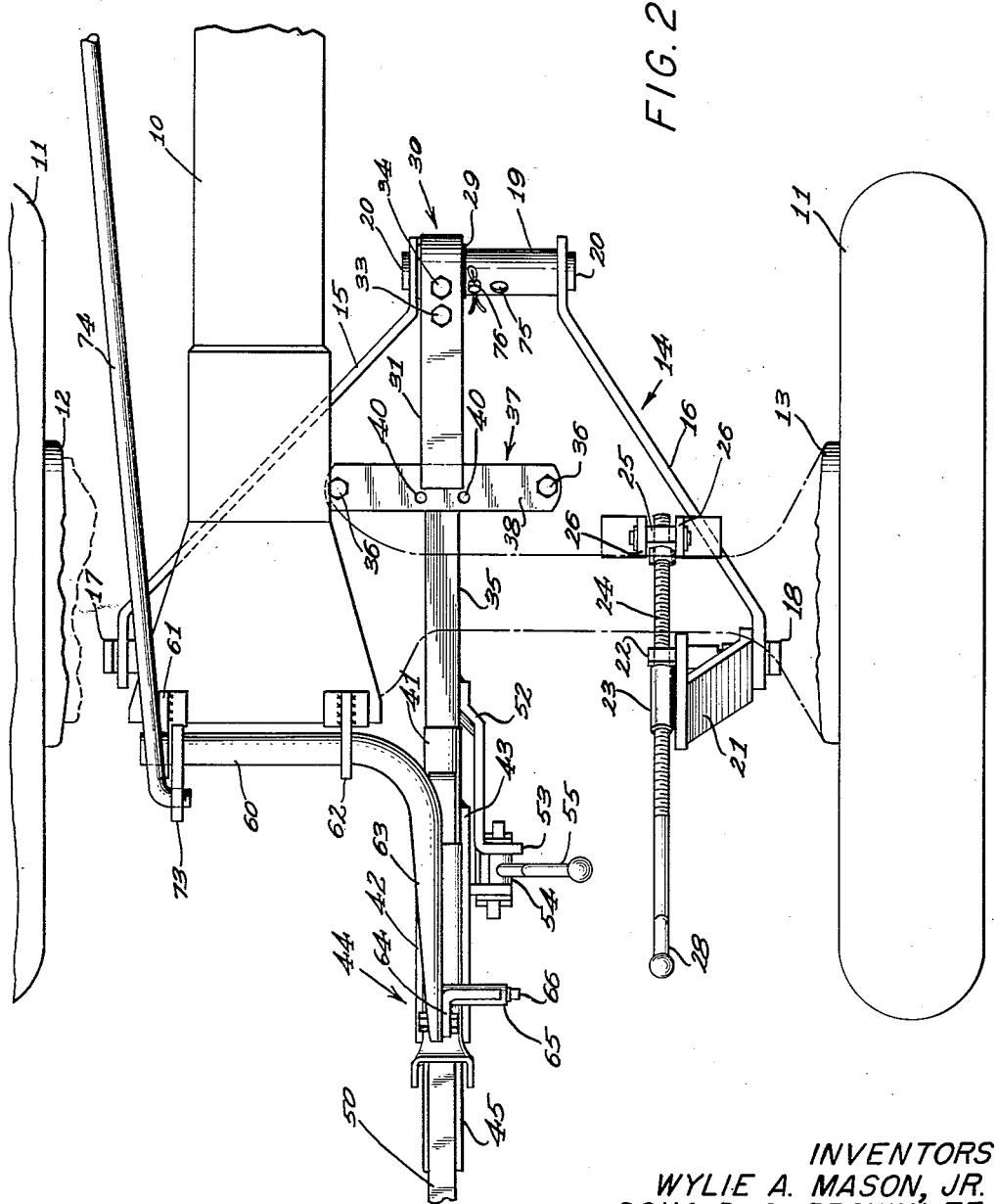
INVENTORS
WYLIE A. MASON, JR.
DONALD S. BROWNLEE
ATTORNEY

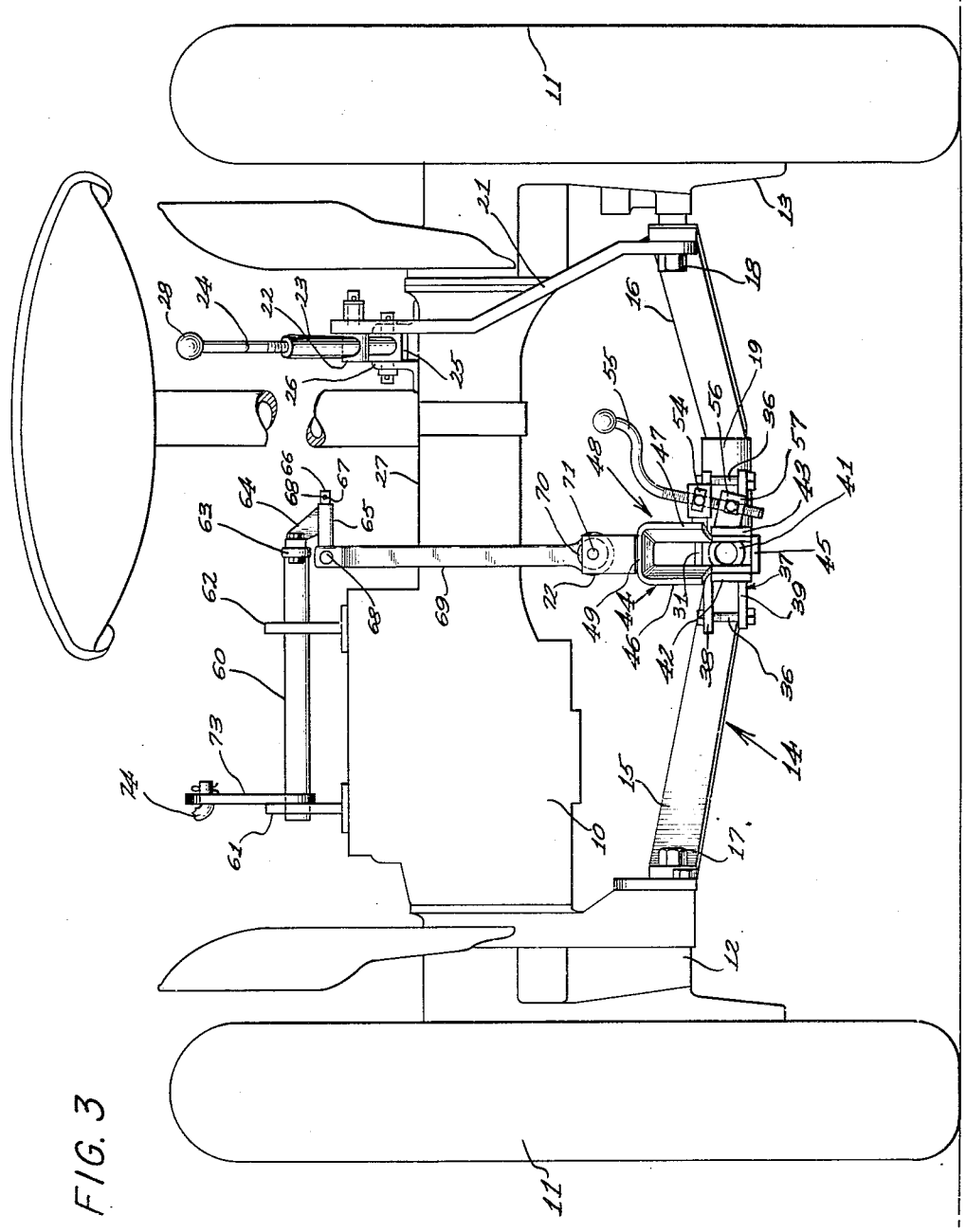

United States Patent Office 2,762,282
Patented Sept. 11, 1956

2,762,282

IMPLEMENT ATTACHING APPARATUS FOR TRACTORS

Wylie A. Mason, Jr., Memphis, Tenn., and Donald S. Brownlee, Charitan, Iowa, assignors to International Harvester Company, a corporation of New Jersey Application June 25, 1954, Serial No. 439,286

4 Claims. (Cl. 97—47.14)

This invention relates to implement attaching apparatus for tractors and particularly to simplified apparatus for facilitating the attachment and detachment of implements from a tractor. More specifically, the invention concerns implement attaching mechanism of the type wherein an elongated tubular socket-like member provided on the tractor is adapted to telescopically receive a complementary elongated shaft-like element on the implement to form an integral association between the tractor and the implement so that the implement can be transported by the tractor and vertically moved as a unit between operating and transport positions.

The invention has for its object the provision of simplified and economical implement attaching apparatus for a tractor of the type involving the provision of an elongated socket member on the tractor adapted to slidably receive a complementary shaft member on the implement, and novel means for leveling the implement.

Another object of the invention is the provision of an implement attaching mechanism of the type referred to, wherein a single elongated tubular member is provided on the tractor for integral association with a single shaft member on the implement, and wherein novel means are provided for limiting the lateral swinging of the implement relative to the tractor including laterally shiftable means in the lift means by which the implement is raised and lowered, accommodating lateral shifting of the implement.

Other objects and advantages of the invention will become clear from the following detailed description when read in conjunction with the accompanying drawings, wherein:

Figure 2 is a plan view with parts removed, of the structure shown in Figure 1, and Fig. 3 is a rear elevation of the structure shown in Figures 1 and 2 without the implement.

Figure 1:
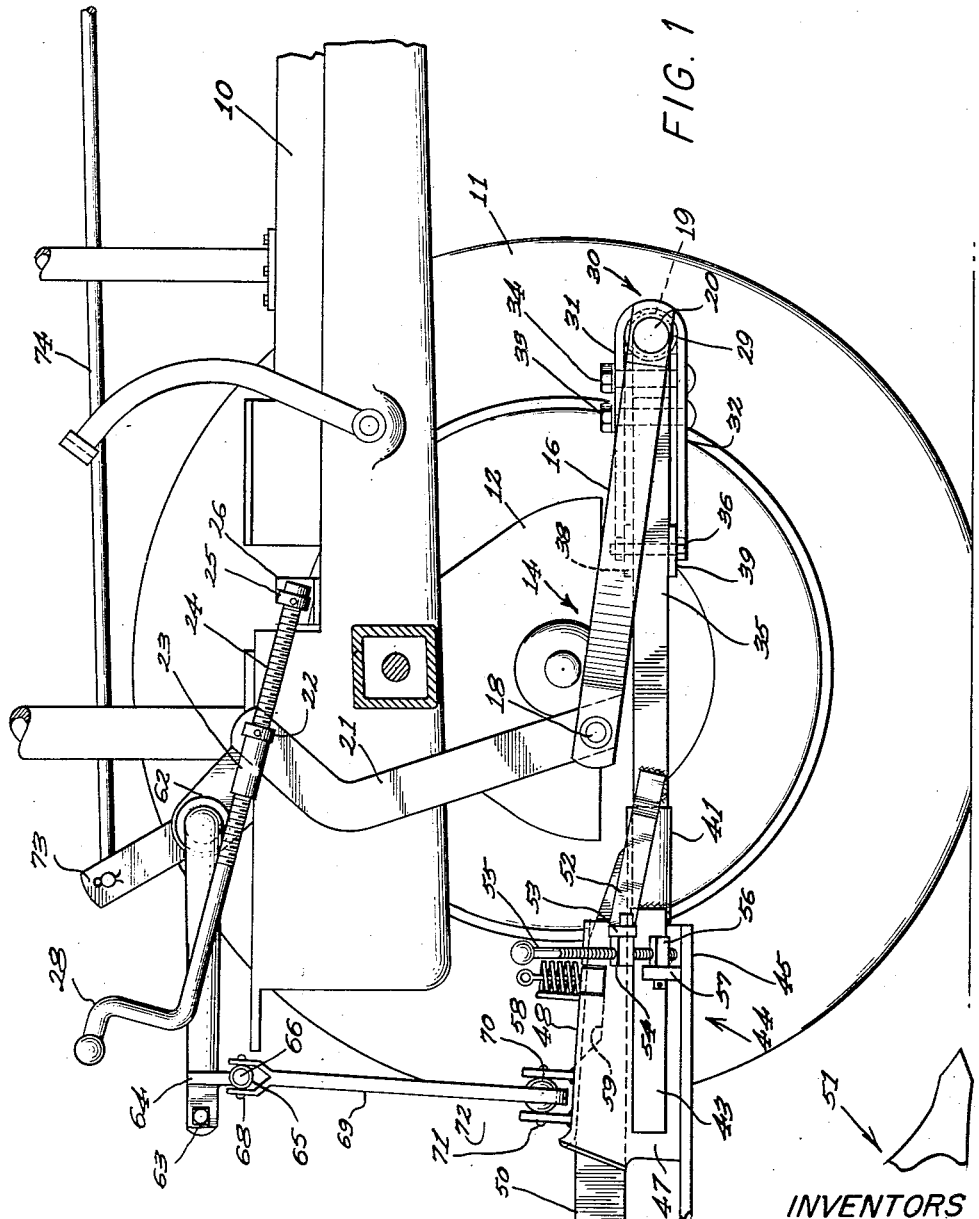
Figure 1 is a view in side elevation of the rear end of a tractor having one wheel removed and showing the implement attaching apparatus according to this invention incorporated therein.

Referring to the drawings the numeral 10 designates the longitudinally extending laterally offset body of a tractor having laterally spaced drive wheels 11 mounted upon depending axle housings 12 and 13. Attached to the under side of the tractor is a draw frame 14 comprising forwardly converging straps 15 and 16, the rear ends of which are pivotally mounted at 17 and 18, respectively, upon the depending axle housings 12 and 13 of the tractor. The forward ends of the straps 15 and 16 are connected by a spacer 19 secured to the ends of the straps by caps 20.

The draw frame 14 is capable of swinging in a vertical plane about the pivots 17 and 18, and this vertical movement is controlled by mechanism including a lever 21 having its lower end affixed, as by welding, to the rear end of the right-hand strap 16 and extending upwardly therefrom. The upper end of the lever 21 has mounted thereon a swivel 22 which includes a threaded sleeve part 23 adapted to receive a threaded rod 24, the forward end of which is rotatably received in a swivel 25 carried by a pair of lugs 26 mounted on the rear axle housing 27 of the tractor. A crank 28 is provided at the rear end of the rod 24, and operation thereof rocks the lever 21 forwardly or rearwardly to vertically move the draw frame 14.

Rotatably mounted upon the spacer 19 is a sleeve 29 which is straddled by and secured to the bight portion of a U-shaped bearing strap 30 having vertically spaced arms 31 and 32 connected by bolts 33 and 34, bolt 33 being received in a suitable opening provided in the forward end of a longitudinally extending draft bar 35. Lateral swinging of the draft bar 35 is thus accommodated by its pivotal connection to the bolt 33. This lateral swinging is limited by the provision of a pair of bolts 36 in the laterally outer ends of a guide and limiting member 37, comprising vertically spaced plates 38 and 39 at right angles to the arms 31 and 32 and extending outwardly therefrom. Openings 40 are also provided in the plates 38 and 39 to optionally receive the bolts 36, said bolts in this position being adapted to engage the sides of the draft bar 35 and prevent lateral swinging thereof.

The draft bar 35 extends rearwardly from the rear axle housing 27 under the tractor, and has rotatably mounted thereon a bearing 41 to which are welded the forward ends of laterally spaced straps 42 and 43 which are, in turn, welded to opposite sides of an elongated tubular socket member 44, comprising a base 45 to which are affixed the depending arms 46 and 47 of a reverse U-shaped portion 48 having a transverse part 49. The rear end of the upper part of the U-shaped portion 48 of the socket member is flared outwardly at its rear end to facilitate entry of the elongated complementary shaft-like member 50 forming a part of and projecting forwardly from the implement designated at 51. By virtue of the connection of the tubular socket 44 to the bearing 41, the socket is capable of rotary movement about a longitudinal axis.

The socket member 44 is adjusted to selected positions about its longitudinal axis for the purpose of leveling the implement, and this is accomplished by the provision of a bracket 52 having its forward end welded to the side of the draft bar 35, and having a laterally bent rear end 53 on which is pivotally mounted a swivel 54. A crank 55 is rotatably mounted in the swivel 54 and its end is threaded for reception in a threaded aperture provided in another swivel 56 mounted upon a lug 57 affixed to the side of the socket member 44. The crank 55 is thus anchored through the bracket 52 to the draft bar 35, and manipulation thereof rotates the tubular socket 44 and tilts it laterally to selected positions for the purpose of leveling the implement connected thereto. The shaft member 50 is held against longitudinal displacement in the socket 44 by suitable releasable detent mechanism indicated at 58, adapted for operative engagement with a groove 59 provided in the shaft 50, and is preferably spring-pressed.

Vertical movement of the implement attaching apparatus of this invention and of the implement 51 as a unit therewith is accomplished by the provision of a rockshaft 60 rotatably mounted in brackets 61 and 62 on the body of the tractor and having a rearwardly bent arm 63 connected at its end to a bracket 64 having affixed thereto a transverse sleeve 65. Sleeve 65 rotatably receives a pin 66 provided at its end with apertures 67 adapted to receive a bolt 68, upon which is pivotally mounted the upper end of a lift link 69, the lower end of which is connected by a ball and socket joint 70 to a pin 71 mounted in a pair of lugs 72 affixed to and projecting upwardly from the socket member 44. Also mounted upon the rockshaft 60 is an arm 73 to which is connected the rear end of a rod 74, which extends forwardly for connection with suitable power transmission means, not shown, deriving power from the tractor power plant. Rocking of the shaft 60 thus raises and lowers the draft bar 35 about its pivot on the spacer 19.

The spacer 19 is provided with several openings 75 for the reception of a pin 76 which holds the bearing 29 against lateral displacement on the spacer 19. Lateral shifting of the hitch point of the draft bar 35 and of the implement is accomplished by removing the pin 76 and sliding the bearing 29 to the other end of the spacer 19, replacing the pin 76 in an adjacent opening 75. When this shifting of the hitch is made, the lifting link 69 is likewise shifted by removal of the bolt 68 and connection of the upper end of link 69 to the other end of the pin 66.

From the foregoing it will be clear that simple and efficient implement attaching apparatus has been devised for facilitating the attachment and detachment of an implement from a tractor. With the connecting device of this invention, the tractor may simply be backed to the implement until the shaft 50 is fully received in socket 44, and the implement becomes integral with the tractor. It should be understood that the invention has been described in its preferred embodiment only, and that modifications may be made therein without departing from the spirit of the invention or the scope of the appended claims.

What is claimed is:

1. In attaching apparatus for a tractor for the connection thereto of an implement having a longitudinally elongated shaft-like attaching element generally rectangular in section, a draft bar connected at its forward end to the tractor for vertical movement relative thereto and extending rearwardly therefrom, lift means on the tractor operatively connected to the rear end of the draft bar for raising and lowering the latter, a complementary longitudinally elongated generally rectangular socket member pivotally mounted at the rear end of said draft bar for rotation relative thereto about a central longitudinal pivot axis and adapted to non-rotatably slidably and telescopically receive the shaft-like attaching element on the implement, said socket member being of such dimensions as to form an integral association with the shaft-like element, whereby the implement is raised and lowered with the draft bar upon vertical movement of the latter, and said lift means including means connected to the forward end of said draft bar for raising and lowering the latter to maintain the draft bar level and facilitate reception of the shaft-like attaching element in the socket, and adjustable means operatively connected to the draft bar and to said socket member for rotating the latter about its pivot axis relative to said draft bar and holding it rigidly in a selected adjusted position.

2. The invention set forth in claim 1, wherein the lift means comprises a rockable arm on the tractor and a vertically extending lift link pivotally connected to said arm and to said draft bar, the connection of the link to said rockable arm including means accommodating the optional connection of the arm thereto at laterally spaced locations.

3. In attaching apparatus for a tractor for the connection thereto of an implement having a longitudinally elongated shaft-like attaching element generally rectangular in section, a longitudinally extending draft bar connected at its forward end to the tractor for free lateral swinging and for vertical movement relative thereto, a complementary longitudinally elongated generally rectangular socket member pivotally mounted at the rear end of said draft bar for rotation relative thereto about a central longitudinal pivot axis and adapted to telescopically and non-rotatably receive the shaft-like attaching element on the implement and form a close association therewith at longitudinally spaced locations, lift means on the tractor operatively connected to said socket member for raising and lowering the rear end of the draft bar and the implement as a unit including means operatively connected to the draft bar for raising and lowering the forward end thereof to maintain the draft bar level in any position of vertical adjustment thereof to facilitate insertion of the shaft-like element in the socket, means for rotating the socket member relative to the draft bar including means for holding the socket member rigidly in a selected adjusted position relative to the draft bar, said rotating means comprising an internally threaded member affixed to the socket member, and a threaded crank rotatably mounted on the draft bar and receivable in said internally threaded member.

4. In attaching apparatus for a tractor for the connection thereto of an implement having a longitudinally elongated shaft-like attaching element generally rectangular in section, a longitudinally extending draft bar connected to the tractor for free lateral swinging and for vertical movement relative thereto, a complementary longitudinally elongated generally rectangular socket member pivotally mounted at the rear end of said draft bar for rotation relative thereto about a central longitudinal pivot axis and adapted to telescopically and non-rotatably receive the shaft-like attaching element on the implement and form a close association therewith at longitudinally spaced locations, lift means on the tractor operatively connected to said socket member for raising and lowering the draft bar and the implement as a unit, including a rockable arm mounted on the tractor for vertical movement and a vertically extending lifting link pivotally connected to said rockable arm and to the socket member, the connection of the lifting link to the rockable arm including means for optionally connecting said link thereto at a laterally spaced location, whereby the socket member is laterally shifted relative to the tractor, and means connecting the socket member to the draft bar for rotating the socket member relative to the draft bar including means for holding the socket member rigidly in a selected adjusted position relative to the draft bar.

References Cited in the file of this patent

UNITED STATES PATENTS

| 1,464,740 | Benjamin et al. | Aug. 14, 1923 |
| 1,688,615 | Daniel | Oct. 23, 1928 |
| 1,864,639 | Crezee | June 28, 1932 |
| 1,939,950 | Brown | Dec. 19, 1933 |
| 2,453,197 | Clay | Nov. 9, 1948 |
| 2,505,580 | Todd | Apr. 25, 1950 |
| 2,602,389 | Markel | July 8, 1952 |
| 2,616,349 | Lindeman et al. | Nov. 4, 1952 |
| 2,697,974 | Silver et al. | Dec. 28, 1954 |

FOREIGN PATENTS

| 1,013,199 | France | Apr. 30, 1952 |